United States Patent [19]

Norton, Jr. et al.

[11] 4,141,700
[45] Feb. 27, 1979

[54] FIN STRUCTURE FOR AIR PRE-CLEANER

[75] Inventors: Wilson L. Norton, Jr.; Willis H. Risse, both of Oklahoma City, Okla.

[73] Assignee: Air Refiner, Inc., Oklahoma City, Okla.

[21] Appl. No.: 727,137

[22] Filed: Sep. 27, 1976

[51] Int. Cl.² ............................................. B01D 50/00
[52] U.S. Cl. ...................................... 55/337; 55/457; 55/432; 210/304
[58] Field of Search .................. 55/337, 392, 394–399, 55/432, 429, 456, 457; 210/304

[56] References Cited

U.S. PATENT DOCUMENTS

| 3,078,650 | 2/1963 | Anderson et al. | 55/337 |
| 4,014,796 | 3/1977 | Sugiyama et al. | 55/500 |

FOREIGN PATENT DOCUMENTS 1278115  10/1961  France ......................... 55/337

Primary Examiner—Bernard Nozick
Attorney, Agent, or Firm—Robert M. Hessin

[57] ABSTRACT

An improved unitary fin structure for installation on the filter element of an air pre-cleaner and final filter for an internal combustion engine or the like. The improved fin structure includes self-biased lock tab elements forming an integral part thereof for securing the fin structure to a conventional air filter element while providing means for the non-destructive removal thereof from the filter element. An alternate embodiment of the fin structure of the present invention provides for the manufacture of the fin structure in a substantially flat strip with coupling means on the opposite ends thereof for assembling the strip into a substantially cylindrical configuration at the time of installation on the filter element. Various forms of coupling means for engaging the opposite ends of the strip are also disclosed.

21 Claims, 24 Drawing Figures

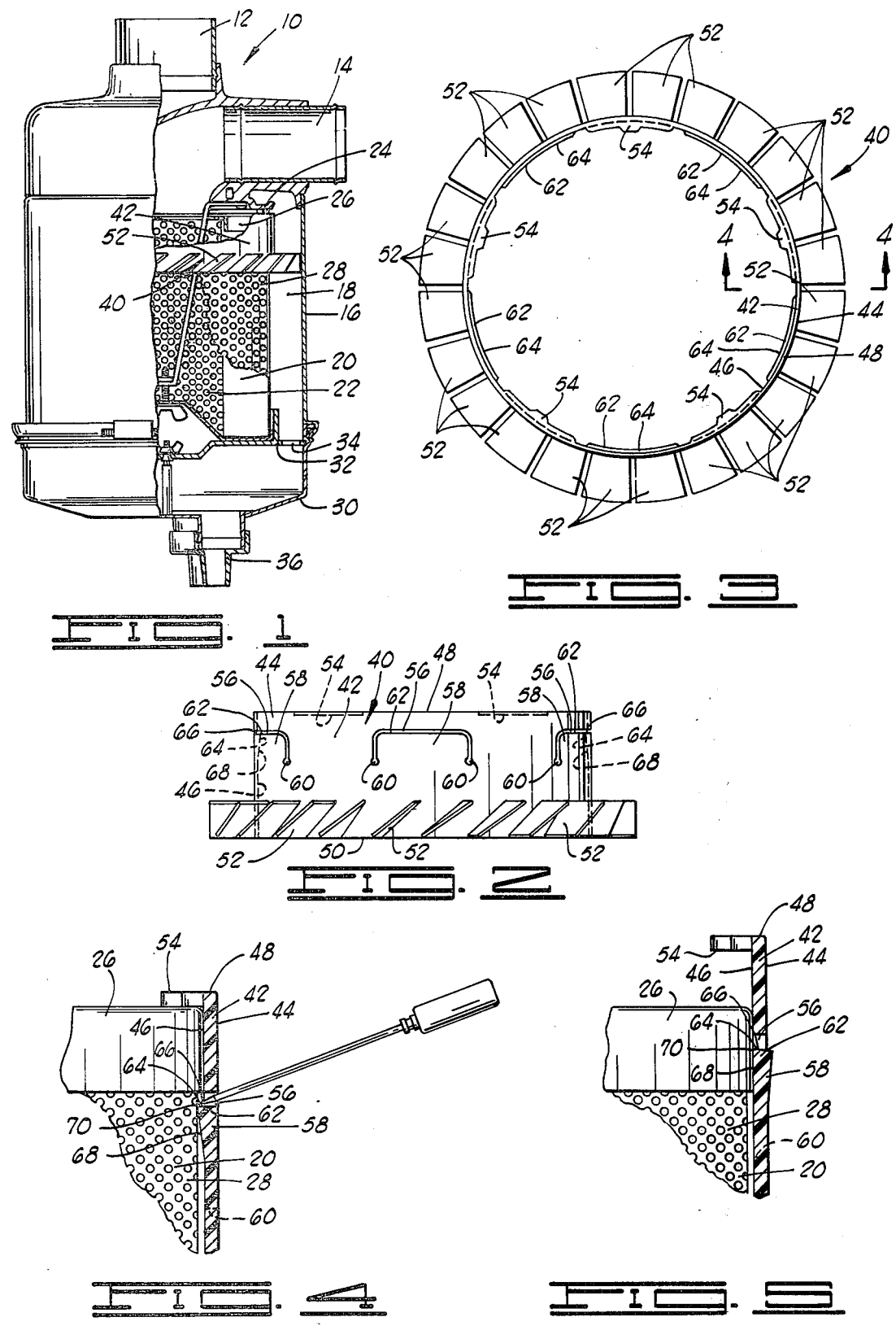

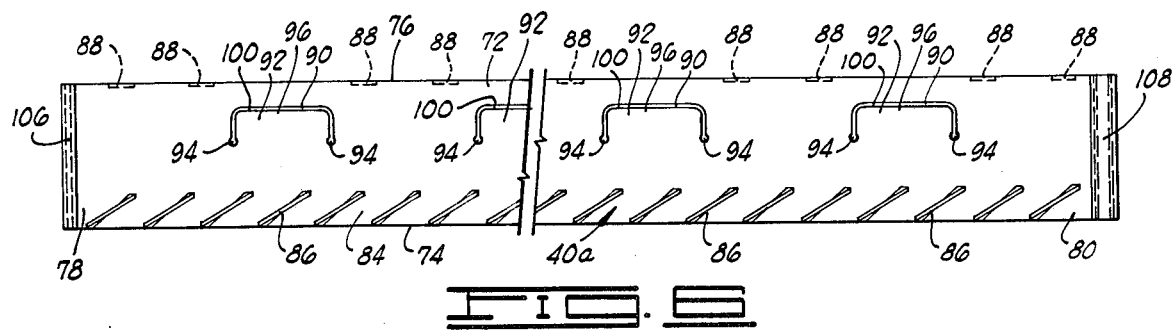
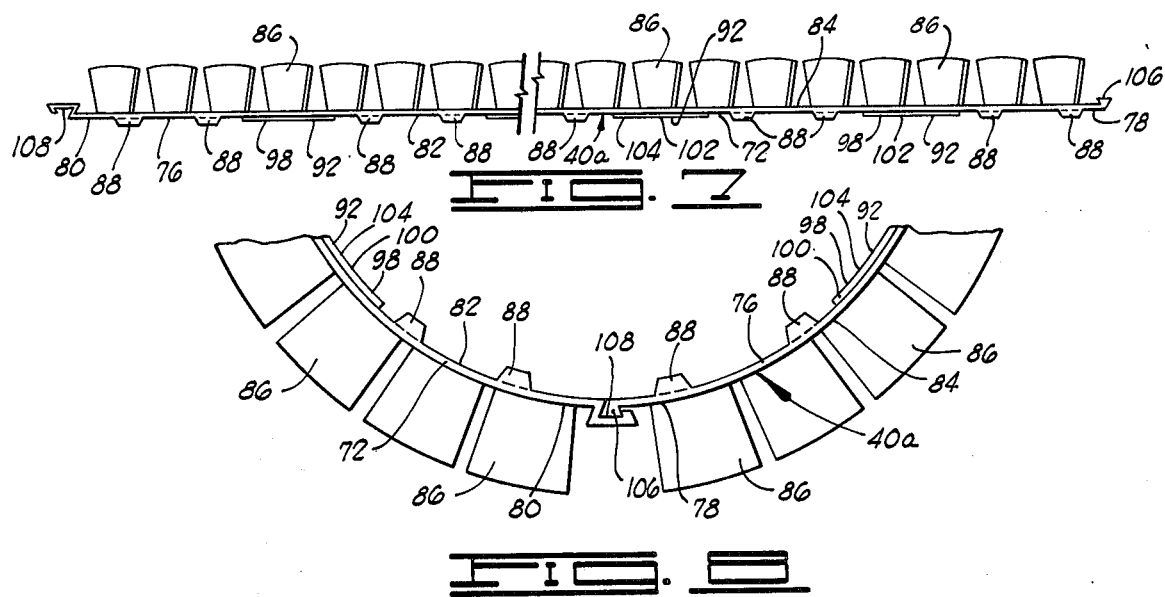
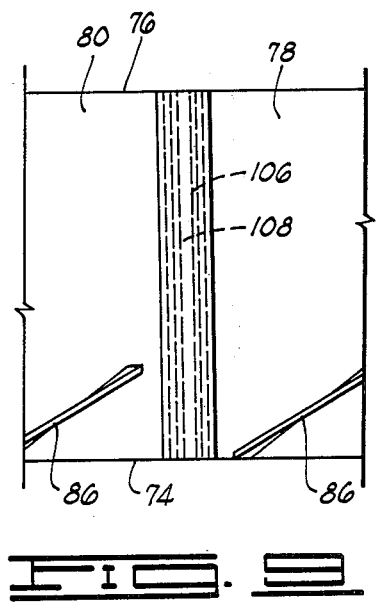

FIN STRUCTURE FOR AIR PRE-CLEANER

BACKGROUND OF THE INVENTION

1. Field of the Invention

This invention relates generally to improvements in air filtration, and more particularly, but not by way of limitation, to improved fin structure for air filters having a centrifugal pre-cleaner stage.

2. Description of the Prior Art

It is well known in the prior art to provide air cleaner assemblies for internal combustion engines or the like which employ a cyclonic or centrifugal pre-cleaner stage prior to the introduction of the incoming air through the conventional paper filter element. In these assemblies, unitary molded plastic fin structures, of substantially cylindrical shape, are disposed about the cylindrical outer periphery of a conventional air filter element. These fin structures are further characterized by a plurality of circumferentially spaced, diagonal fins or vanes mounted on the cylindrical outer periphery thereof which extend across an annular space or chamber defined by the exterior of the filter element and the inner wall of the filter housing within which the filter element is mounted.

In the assembly of the prior art fin structures upon the corresponding filter elements, it is common for the molded plastic fin structures to crack or split in the event of misalignment between the fin structure and the filter element when the fin structure is forced over the end cap of the filter element. It is also virtually impossible to remove and reuse a prior art fin structure from a filter element upon which it as been assembled when the filter element must be renewed or replaced, thus increasing the cost of filter element replacement to the manufacturer and the consumer. It is also common for replacement filter elements, with prior art fin structures assembled thereto, to be mishandled between the manufacturer and time of installation in an air cleaner assembly to the extent that one or more fins may be broken from the filter element or, in more extreme cases, the fin structure may become split and thereby become permanently disengaged from the filter element, thus rendering the replacement filter element useless for its intended purpose.

The prior art fin structures are also relatively bulky to store in the manufacturer's warehouse thus increasing storage costs which cost increases must ultimately be borne by the consumer.

The various embodiments of the present invention overcome these deficiencies in the prior art and provide many advantages thereover.

SUMMARY OF THE INVENTION

The present invention contemplates an improved fin structure for installation about the substantially cylindrical outer periphery of an air filter element of the type having a radially outwardly extending rib formed about the outer periphery thereof. The fin structure comprises a substantially cylindrical body portion having a cylindrical outer surface, a cylindrical inner surface, an upper end face and a lower end face, with the inner and outer surfaces defining a relatively thin cylindrical wall. Fins extend radially outwardly from the outer surface of the body portion for directing the flow of air passing thereby. Bosses extend radially inwardly from the inner surface of the body portion for engaging the rib of the air filter element to limit longitudinal movement of the fin structure in one direction relative to the air filter element. At least one generally U-shaped aperture extends through the wall of the body portion thereby defining a corresponding resilient cantilevered lock tab having a radially inwardly extending lip on the free end thereof for engaging the rib of the air filter element to limit longitudinal movement of the fin structure in the opposite direction relative to the filter element.

In another form, the present invention contemplates a fin structure for installation about the cylindrical outer surface of a conventional air filter element in which the fin structure comprises a relatively thin strip having first and second parallel longitudinal edgs interconnecting opposite end portions thereof and having inner and outer side walls. The fin structure further includes a plurality of outwardly projecting fins formed on the outer side wall. Means are formed on the inner side walls for engaging the outer surface of the air filter element to secure the fin structure thereto. The fin structure further includes first and second coupling means formed respectively on the opposite end portions of the stip for mutually engaging the opposite end portions to secure the strip about the outer surface of the filter element with the fins extending radially outwardly therefrom.

An advantage of the present invention resides in the provision thereby of increased efficiency in air filtration.

Another advantage of the present invention resides in the provision thereby of simplified and trouble free installation of fin structures on filter elements.

A further advantage of the present invention resides in the provision thereby of a fin structure suitable for construction with economical materials.

A still further advantage of the present invention resides in the provision thereby of a fin structure which reduces manufacturing and storage costs.

Yet another advantage of the present invention resides in the provision thereby of a fin structure which is reusable on replacement filter elements.

Another advantage of the present invention resides in the provision thereby of a fin structure which is less susceptible to breakage during the assembly thereof on a filter element.

Other objects and advantages of the present invention will be evident from the following detailed description when read in conjunction with the accompanying drawings.

BRIEF DESCRIPTION OF THE DRAWINGS

FIG. 1 is a side elevation view of a filter assembly with a centrifugal pre-cleaning stage showing portions of the housing, filter element and improved fin structure of the present invention broken away to more clearly illustrate the details of construction.

FIG. 2 is a side elevation view of an improved fin structure constructed in accordance with the present invention.

FIG. 3 is a top plan view of the fin structure of FIG. 2.

FIG. 4 is an enlarged partial cross-sectional view taken along line 4—4 of FIG. 3 illustrating the technique for releasing the lock tabs for removal of the fin structure from a filter element.

FIG. 5 is an enlarged partial cross-sectional view, similar to FIG. 4, illustrating the condition of the lock tabs relative to the filter element both during installation and removal of the fin structure therefrom.

FIG. 6 is a side elevation view of an alternate form of improved fin structure constructed in accordance with the present invention prior to its assembly into a substantially cylindrical configuration.

FIG. 7 is a top plan view of the fin structure of FIG. 6.

FIG. 8 is a partial top plan view of the fin structure of FIG. 6 assembled into a substantially cylindrical configuration.

FIG. 9 is partial side elevation view of the fin structure as shown in FIG. 8 illustrating the details of engagement between the opposite end portions thereof.

FIG. 10 is a partial top plan view of a fin structure similar to that illustrated in FIG. 8 showing another form of engagement between the opposite end portions thereof.

FIG. 11 is a partial top plan view similar to FIG. 10 illustrating another form of engagement between the opposite end portions of the fin structure.

DESCRIPTION OF THE PREFERRED EMBODIMENTS

Figure 12:
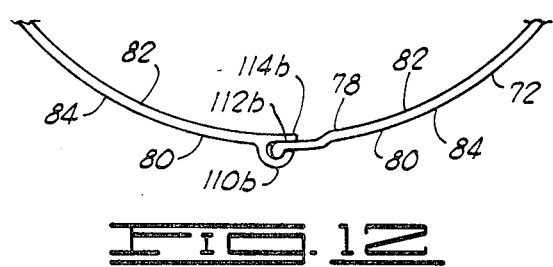
FIG. 12 is a partial top plan view similar to FIG. 10 illustrating another form of engagement between the opposite end portions of the fin structure.

Referring now to the drawings, the present invention is directed to improvements in air filters suitable for use with internal combustion engines. An important advance in the field of internal combustion air filter designs is embodied in the combination of a cyclone or centrifugal pre-cleaning stage prior to the introduction of the air through a conventional paper filter. One such apparatus typical of the combination of centrifugal pre-cleaning and paper filtration is illustrated in FIG. 1 and the apparatus is generally designated by the reference character 10.

The apparatus 10 includes an air inlet passage 12 and an air outlet passage 14 each communicating with a housing 16. The air inlet passage 12 communicates with an annular chamber or space 18 defined by the housing 16 and conventional cylindrically shaped paper filter element 20 positioned concentrically within the housing 16. The interior 22 of the filter element 20 communicates with the air outlet passage 14. An annular seal 24 provides sealing engagement between the filter element 20 and the entrance to the air outlet passage 14. The filter element 20 further includes an end cap 26 which is fixedly secured to one end of the perforated cylindrical outer wall 28 of the filter element adjacent the annular seal 24.

A dust cup 30 is removably secured to the housing 16 and is separated from the interior of the housing by means of a baffle plate 32. A slot or port 34 is formed in the baffle plate 32 and provides communication between the annular space 18 and the interior of the dust cup 30. A suitable valve 36 is mounted in the lower portion of the dust cup 30 to provide for removal of dust which has become deposited within the dust cup 30.

To provide for the centrifugal or cyclone pre-cleaning of air passing through the apparatus 10, a fin structure 40 is disposed about the filter element 20 in the annular space or chamber 18. The fin structure may be formed of any suitable material. It has been found that a plastic or synthetic resinous material is well adapted for this purpose, molded polypropylene being a preferred material.

The fin structure 40 is of novel construction and provides distinct advantages over known prior art fin structures. The fin structure 40 includes a substantially cylindrical body portion 42 having a substantially cylindrical outer surface 44, a substantially cylindrical inner surface 46, an upper end face 48 and a lower end face 50 as best shown in FIGS. 2, 3, 4 and 5. The inner and outer surfaces 46 and 44 define a relatively thin cylindrical wall.

A plurality of fins 52 extend radially outwardly from the outer surface 44 of the body portion 42 in circumferentially spaced relation adjacent the lower end face 50. The fins 52 are inclined at an angle to the longitudinal axis of the body portion 42 and extend across the annular space or chamber 18 in the housing 16 to direct the flow of air passing thereby into a high-speed rotation within the annular chamber 18 to thereby separate a large portion of any dust entrained in the air by centrifugal action. Such dust particles are directed toward the inside wall of the housing 16 and fall by gravity downwardly through the slot or port 34 into the dust cup 30.

The fin structure 40 further includes a plurality of circumferentially spaced, radially inwardly extending bosses 54 formed on the inner surface 46 adjacent the upper end face 48 of the body portion 42. The bosses 54 engage the upper end face of the end cap 26 of filter element 20 as shown in FIG. 4 to longitudinally position the fin structure 40 relative to the filter element 20 and prevent longitudinal displacement of the fin structure 40 downwardly relative to the filter element 20 as viewed in FIG. 4.

A plurality of circumferentially spaced U-shaped apertures 56 extend through the cylindrical wall of the body portion 42 along a line lying in a plane parallel to and intermediate the planes defined by the upper and lower end faces 48 and 50 of the body portion 42. Each aperture 56 defines an upwardly extending corresponding resilient cantilevered lock tab 58. The opposite ends of each U-shaped aperture 56 are preferably defined by an enlargement 60 having a diameter approximately two times the width of the remainder of the U-shaped aperture. The upper end portion of free end 62 of each lock tab 58 includes a radially inwardly extending lip 64 for engaging the lower edge of the end cap 26 of the filter element 20. The lip 64 is biased radially inwardly by the inherent spring action of the resilient lock tab 58 in the engagement of the lip 64 with the end cap 26, which cap essentially forms an annular rib about the cylindrical outer wall 28 of the filter element 20, and prevents any undesired longitudinal displacement of the fin structure 40 relative to the filter element 20 in an upward direction as viewed in FIGS. 1 and 4. The lip 64 comprises a radially inwardly extending ledge 66 and an inclined inner surface 68 extending between the inner edge 70 of the ledge 66 and the intermediate portion of the lock tab 58 at a distance from the ledge 66.

The novel configuration of the lock tabs 58 facilitates the quick and secure assembly of the fin structure 40 about the end cap 26 of a corresponding filter element 20. The inherent resilience of the lock tabs 58 permit the lock tabs to be deflected radially outwardly as shown in FIG. 5 to permit the passage of the end cap 26 thereby as the fin structure and filter element are moved longitudinally together about their coaxial cylindrical axes. When the lips 64 of the lock tabs 58 clear the lower edge of the end cap 26, the lock tabs 58 spring radially inwardly at which point the ledges 66 are properly positioned to prevent the inadvertent removal of the fin structure 40 from the filter element 20.

When it is desired to remove the fin structure 40 from a filter element 20 so that a new filter element can be installed and the old fin structure can be reused, it will be seen that by inserting the blade of a screwdriver or the like through the U-shaped aperture 56 adjacent the upper end portion 62 of the lock tab 58, the lip 64 can be pried radially outwardly until it will clear the end cap 26. By proceeding sequentially around the fin structure 40 to release each lock tab 58 as described, the fin structure 40 can be freed to slide upwardly in an unrestricted manner from engagement with the old filter element 20.

It should further be noted that the use of the improved fin structure 40 with the resilient lock tabs 58 eliminates the relative frequency of breakage of fin structures constructed in accordance with the prior art when installing them on filter elements, especially when installing them on filter elements of relatively small diameter. It will also be noted that this improved fin structure of the present invention permits the use of less expensive plastic or synthetic resin materials in the molding or forming of the fin structure since the elongation characteristics of the material employed in the construction of the fin structure of the present invention are not nearly as critical as they are in the prior art fin structures. The improved fin structure 40 is well adapted to be molded from the unitary mass of plastic or synthetic resin material, one such suitable material being polypropylene.

Referring now to FIGS. 6, 7 and 8, an alternate form of fin structure constructed in accordance with the present invention is shown therein which is generally designated by the reference character 40a. The fin structure 40a differs from the previously described fin structure 40 in that the fin structure 40a is constructed in the form of an elongated strip which is assembled into a generally cylindrical configuration at the end of installation of the fin structure 40a on the corresponding filter element 20. The previously described fin structure 40, in contrast, is initially molded in the generally cylindrical configuration described above and illustrated in FIGS. 2-5.

The fin structure 40a is preferably formed of a unitary mass of plastic or synthetic resin material such as polypropylene. The structure includes a relatively thin strip 72 having first and second parallel longitudinal edges 74 and 76 and opposite end portions 78 and 80. The strip 72 includes an inner side wall 82 and an outer side wall 84. A plurality of outwardly projecting diagonal fins 86 are formed on the outer side wall 84 adjacent the longitudinal edge 74 in spaced relation.

The fin structure 40a further includes a plurality of longitudinally spaced, outwardly extending bosses or tabs 88 formed on the inner side wall 82 adjacent the longitudinal edge 76 of the strip 72. A plurality of longitudinally spaced U-shaped apertures 90 extend through the strip 72 along a line substantially parallel to and intermediate the longitudinal edges 74 and 76. Each aperture 90 defines an upwardly extending corresponding resilient cantilevered lock tab 92. The opposite ends of each U-shaped aperture 90 are preferably defined by an enlargement 94 having a diameter proximately two times the width of the remainder of the U-shaped aperture. The upper end portion or free end 96 of each lock tab 92 includes a lip 98 which extends outwardly from the plane of the inner side wall 82 for engaging the lower end of the end cap 26 of the filter element 20 as will be described hereinafter. The lip 98 is biased into its outwardly extending portion by the inherent spring action of the resilient lock tab 92 in the engagement of the end cap 26. The lip 98 comprises an outwardly extending ledge 100 and an inclined inner surface 102 which extends between the outermost edge 104 of the ledge 100 and the intermediate portion of the lock tab 92 at a distance from the ledge 100.

The novel configuration of the lock tabs 92 is substantially identical to the lock tabs 58 described above for the fin structure 40 and facilitates the quick and secure assembly of the fin structure 40a about the end cap of a corresponding filter element 20 as will be described hereinafter.

The fin structure 40a is assembled for installation on an air filter element by bending the strip 72 into a cylindrical configuration as shown in FIG. 8 and mutually securing the end portions 78 and 80 of the strip 72 by suitable coupling means. One form of suitable coupling means is illustrated in FIGS. 6, 7 and 8 and comprises an outwardly extending rib 106 formed on the outer side wall 84 along the end portion 78 in substantially normal alignment with the longitudinal edges 74 and 76, and a corresponding groove 108 communicating with the inner side wall 82 along the end portion 80 in substantially normal alignment with the longitudinal edges 74 and 76. The rib 106 is substantially wedge-shaped in cross-section with the edges thereof diverging from the outer side wall 84 as best shown in FIGS. 7 and 8. The groove 108 is also wedge-shaped in cross-section with the edges thereof diverging from the inner side wall 82. The grooe 108 is sized and shaped to securely receive the rib 106 therein, as shown in FIG. 8, to retain the rib therein and to provide mutual engagement between the opposite end portions 78 and 80 of the strip 72 to retain the fin structure 40a in the assembled position as shown in FIG. 8.

When the fin structure 40a is assembled as shown in FIG. 8, the fin structure is then ready for assembly about the end cap 26 of a corresponding filter element 20. The inherent resilience of the lock tabs 92 permit the lock tabs to be deflected radially outwardly, in the same manner as described above and shown in FIG. 5, to permit the passage of the end cap 26 thereby as the fin structure 40a and the filter element 20 are moved longitudinally together about their coaxial cylindrical axes. When the lips 98 of the lock tabs 92 clear the lower edge of the end cap 26, the lock tabs 92 spring radially inwardly at which point the ledges 100 are properly positioned to prevent the inadvertent removal of the fin structure 40a from the filter element 20.

As with the previously described fin structure, when it is desired to remove the fin structure 40a from a filter element 20 so that a new filter element can be installed and the old fin structure can be reused, the previously described technique of inserting the blade of a screwdriver or the like through the U-shaped apertures 90 adjacent the upper end portions 96 of the lock tabs 92 to pry the lips 98 radially outwardly until they clear the end cap can be employed. It should further be noted that the use of the improved fin structure 40a with the resilient lock tabs 92 substantially eliminates the relative frequency of breakage of fin structures constructed in accordance with the prior art when installing them on filter elements. Also the improved fin structure 40a permits the use of less expensive plastic or synthetic resin materials in the molding or forming of the fin structure as noted above for the fin structure 40. An additional advantage of the fin structure 40a resides in the fact that required storage space for the various sizes of fin structures can be greatly reduced by storing the fin structues in the elongated, flat state illustrated in FIGS. 6 and 7.

FIGS. 10–25 illustrate a number of variations of coupling means which may be employed in the fabrication of the fin structure 40a to mutually secure the opposite end portions 78 and 80 to achieve the generally cylindrical configuration illustrated in FIG. 8. In FIG. 10, it will be seen that a first bight portion 110 is formed along the end portion 80 and is substantially C-shaped in cross-section and extends outwardly from the outer side wall 84 of the strip 72. A second bight portion 112 is formed along the opposite end portion 78 of the strip 72 and is also substantially C-shaped in cross-section and extends outwardly from the inner side wall 82 of the strip 72. The first and second bight portions 110 and 112 are sized and shaped to mutually engage one another as shown in FIG. 10 and thereby mutually engage the opposite end portions 78 and 80 of the strip 72. The bight portion 112 is preferably offset from the strip 72 proximate its line of mutual engagement with the first bight portion 110 to maintain the generally cylindrical configuration of the strip 72 as so assembled.

FIG. 11 illustrates a slight variation in coupling means which is substantially similar to that described above and shown in FIG. 10. The slightly modified first bight portion 110a and the slightly modified second bight portion 112a of FIG. 11 are additionally maintained in mutual engagement with one another by means of a resilient lip 114 also formed along the end portion 80 of the strip 72 and extending from the outer side wall 84 a distance beyond the first bight portion 110a. The lip 114 is sized and shaped to yieldably engage the outer surface of the second bight portion 112a when the first and second bight portions are mutually engaged to maintain the fin structure in assembled condition.

The coupling means illustrated in FIG. 12 is another variation of the coupling means described above and illustrated in FIG. 11. FIG. 12, the bight portion 110b is formed along the end portion 80 of the strip 72 and is substantially C-shaped in cross-section and extends in a direction substantially outwardly from the inner side wall 82 and curves in a counterclockwise direction as viewed in FIG. 12. The second bight portion 112b formed along the end portion 78 is also C-shaped in cross-section and extends outwardly from the outer side wall 84 and curves in a counterclockwise direction as viewed in FIG. 12. The coupling means of FIG. 12 further includes a resilient lip 114b formed along the end portion 80 and extending from the inner wall 82 a distance beyond the bight portion 110b, the resilient lip 114b being so sized and shaped as to yieldably engage the exterior surface of the bight portion 112b when the bight portions 110b and 112b are mutually engaged to maintain the fin structure in assembled condition.

Figure 13:
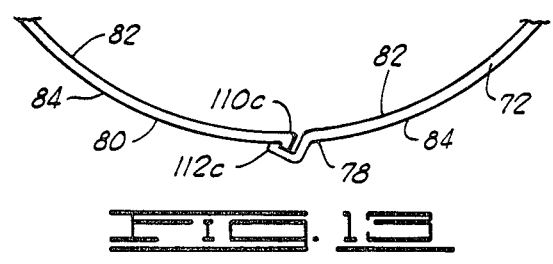
FIG. 13 is a partial top plan view similar to FIG. 10 illustrating another form of engagement between the opposite end portions of the fin structure.

The coupling illustrated in FIG. 13 is substantially identical to that previously described and illustrated in FIG. 11 with the exception that the mutually engaging surfaces of the slightly modified bight portions 110c and 112c are in the form of mutually engaged knife edges and the resilient lip is omitted.

Figure 14:
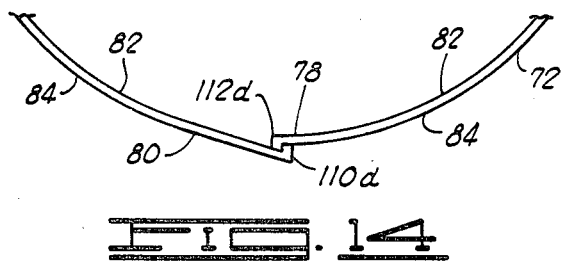
FIG. 14 is a partial top plan view similar to FIG. 10 illustrating another form of engagement between the opposite end portions of the fin structure.

The coupling means illustrated in FIG. 14 is characterized by a modified bight portion 110d formed on the end portion 80 which is substantially C-shaped in cross-section and extends outwardly from the inner side wall 82 while the slightly modified bight portion 112d formed along the end portion 78 is substantially C-shaped in cross-section and extends outwardly from the outer side wall 84. The mutually engaging surfaces of the bight portions 110d and 112d are in the form of oppositely directed knife edges.

Figure 15:
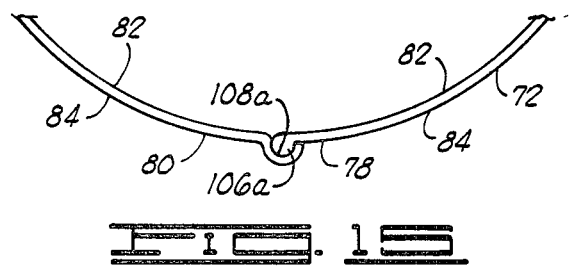
FIG. 15 is a partial top plan view similar to FIG. 10 illustrating another form of engagement between the opposite end portions of the fin structure.

The coupling means illustrated in FIG. 15 is a slightly modified version of the coupling means described above and illustrated in FIGS. 6, 7 and 8. A modified rib 106a is formed along the end portion 78 and extends outwardly from the outer side wall 84. The rib 106a is substantially cylindrical in cross-section. A corresponding modified groove 108a is formed along the end portion 80 and is sized and shaped to receive and retain the rib 106a therein to mutually interconnect the opposite end portions 78 and 80 to maintain the fin structure in assembled condition.

Figure 17:
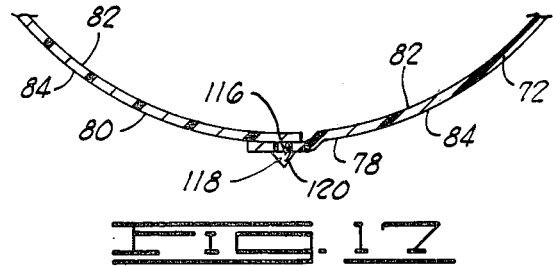
FIG. 17 is a cross-sectional view taken along line 17—17 of FIG. 16.
Figure 16:
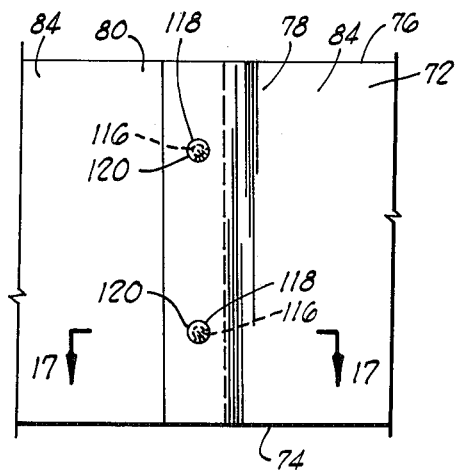
FIG. 16 is a partial side elevation view illustrating another form of engagement between the opposite end portions of the fin structure.

FIGS. 16 and 17 illustrate another form of coupling means. As illustrated therein, a pair of apertures 116 are formed in spaced relation through the strip 72 at the end portion 78 thereof. A corresponding pair of protuberances 118 are formed on the end portion 80 of the strip 72 and extends outwardly from the outer side wall 84. The protuberances 118 each include a conically shaped enlargement 120 formed on the outer end thereof. Mutual engagement is achieved between the end portions 78 and 80 by inserting the protuberances 118 into the corresponding apertures 116. The enlargements 120 prevent the retraction of the protuberances 118 from the apertures 116 after interconnection thereby maintaining the fin structure in the assembled condition. The end portions 78 adjacent the apertures 116 is preferably offset as shown in FIG. 17 to achieve a substantially cylindrical inner surface along the inner side wall 82.

The use of relatively resilient plastic or synthetic resin material for the construction of the fin structure permits the temporary deformation of the apertures 116 and the enlargements 120 during the engagement process.

Figure 21:
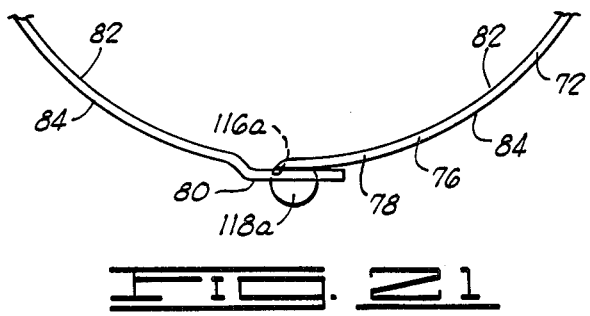
FIG. 21 is a partial top plan view similar to FIG. 10 illustrating another form of engagement between the opposite end portions of the fin structure.
Figure 22:
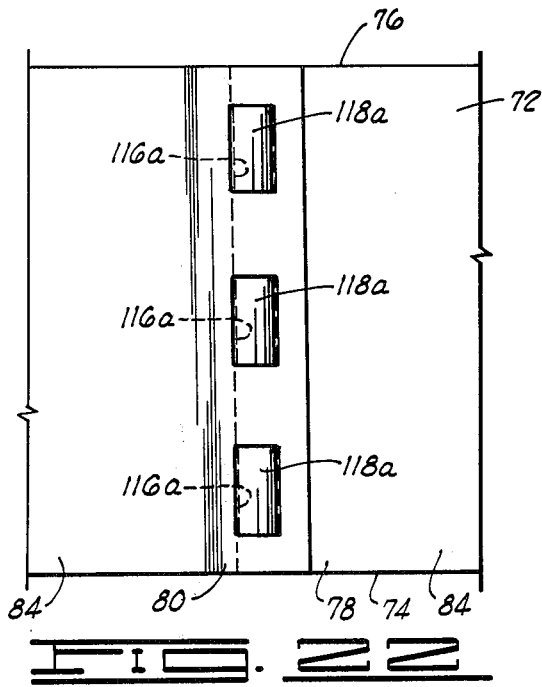
FIG. 22 is a partial side elevation view taken along line 22—22 of FIG. 21.

FIGS. 21 and 22 illustrate a variation of the coupling means described above and illustrated in FIGS. 16 and 17. The coupling means of FIGS. 21 and 22 includes a plurality of substantially rectangular apertures 116a formed through the strip 72 adjacent the portion 80. A corresponding plurality of protuberances 118a are formed along the end portion 78 and extend outwardly from the outer side wall 84. The protuberances 118a are substantially circular in horizontal cross-section and are preferably molded in the form of cylinders in substantial normal alignment with the longitudinal edges 74 and 76 of the strip 72. The vertical length of each aperture 116a is slightly greater than the vertical length of the corresponding protuberance 118a while the horizontal width of each aperture 116a is slightly less than the diameter of the corresponding cylindrically shaped protuberance 118a. It will be seen in FIG. 21 that the configuration of the protuberances results in an enlargement being formed thereby at a distance outwardly from the outer side wall 84. To assemble the fin structure, the protuberances 118a are engaged with and snapped into the corresponding apertures 116a, the diameter of each protuberance being in excess of the width of each corresponding aperture maintains the protuberances and apertures in mutual engagement thus retaining the fin structure in assembled condition.

Figure 23:
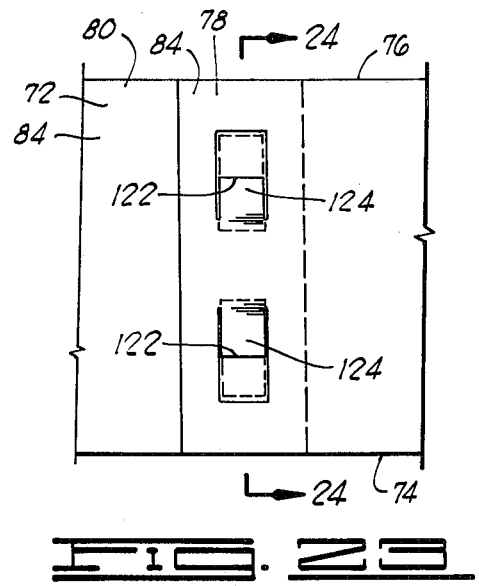
FIG. 23 is a partial side elevation view illustrating another form of engagement between the opposite end portions of the fin structure.
Figure 24:
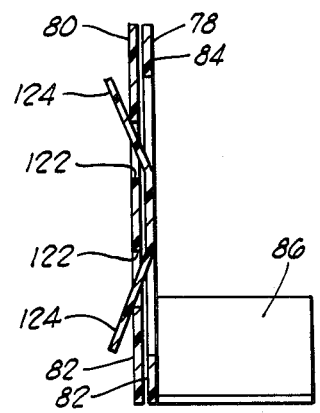
FIG. 24 is a cross-sectional view taken along line 24—24 of FIG. 23.

FIGS. 23 and 24 illustrate another variation of the coupling means for securing the opposite ends 78 and 80 of the strip 72 in assembled condition. In this configuration, a pair of apertures 122 are formed through the strip 72 adjacent the end portion 80 thereof. A pair of wing-like diverging protuberances 124 extend outwardly from the inner side wall 82 adjacent the end portion 78 of the strip 72. The protuberances 124 are preferably lanced from the strip 72 and are relatively resilient. To interconnect the end portions 78 and 80, the protuberances 124 are squeezed together against their inherent resilience and inserted in the respective apertures 122. The protuberances are then released and allowed to spring back to their original position thereby securing the end portions 78 and 80 in mutual engagement thus placing the fin structure in assembled condition.

Figure 18:
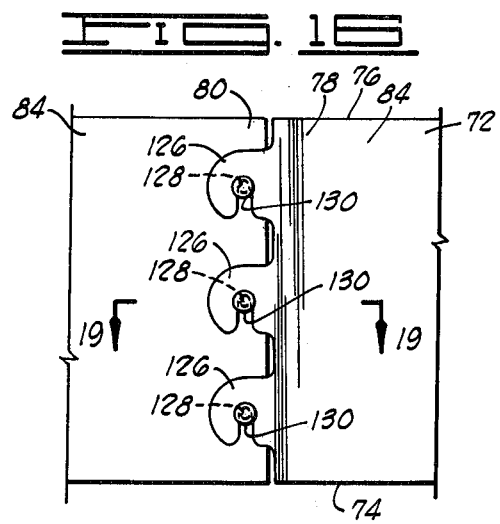
FIG. 18 is a partial side elevation view illustrating another form of engagement between the opposite end portions of the fin structure.
Figure 19:
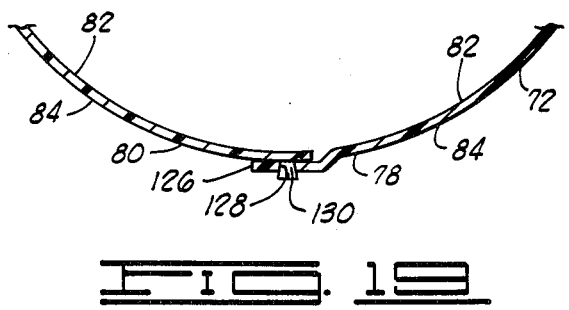
FIG. 19 is a cross-sectional view taken along line 19—19 of FIG. 18.

FIGS. 18 and 19 illustrate another variation in coupling means for mutually securing the opposite end portions 78 and 80. The coupling means includes three hook members 126 formed in spaced relation on and extending from the end portion 78 of the strip 72. Each hook member 126 includes a cavity 128 opening downwardly, as viewed in FIG. 18, in a direction substantially normal to the longitudinal edges 74 and 76 of the strip 72. Three corresponding protuberances 130 are formed on the end portion 80 and extend outwardly from the outer side wall 84. The cavities 128 of each hook member 126 and the protuberances 130 are so sized and shaped that each protuberance 130 is securely received within the corresponding cavity 128 to mutually engage one another and thereby mutually engage the opposite end portions 78 and 80 of the strip 72 to assemble the fin structure. The diameter of each protuberance 130 is preferably slightly greater than the downwardly directed opening of each corresponding cavity 128 to provide snap engagement between each protuberance and the corresponding cavity in which it is received. The hook members 126 are preferably offset as shown in FIG. 19 to provide a substantially cylindrical inner surface formed by the inner side wall 82 of the strip 72 when the fin structure is assembled.

Figure 20:
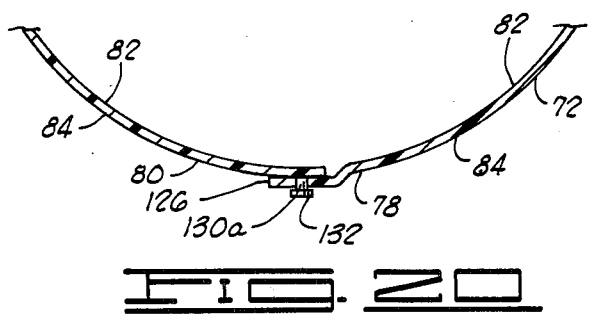
FIG. 20 is a cross-sectional view similar to FIG. 19 illustrating a slight variation in structure.

FIG. 20 shows a slight variation of the coupling means described above and illustrated in FIGS. 18 and 19, differing only in the addition of an enlargement 132 formed on the outer end of each slightly modified protuberance 130a.

From the foregoing it will be seen that the present invention provides a number of forms of novel fin structure for installation on the filter element of an air filter assembly of the type which provides a cyclonic or centrifugal pre-cleaning stage prior to the introduction of the air through the filter element. The various forms of the invention described above and shown in the drawings provide distinct advantages over the prior art in economy of manufacture, material cost, storage cost, ease of assembly and reduction or breakage.

Changes may be made in the construction and arrangement of parts or elements of various embodiments as disclosed herein without departing from the spirit and scope of the invention as defined in the following claims.

What is claimed is:

1. A fin structure for installation about the cylindrical outer surface of a conventional air filter element of the centrifugal pre-cleaner type having radially inward air flow for exhaust of clean air via an axial interior passage, said fin structure comprising:
   a flat, relatively thin rectangular strip of resilient material having first and second parallel longitudinal edges, opposite end portions, and having inner and outer side walls;
   a plurality of outwardly projecting fins unitarily formed on the outer side wall to project generally perpendicular to said strip with each aligned at a pre-set diagonal relative to said parallel longitudinal edges;
   means formed on the inner side wall for engaging the outer surface of said air filter element to secure said fin structure thereto when in operational attitude; and
   first and second coupling means formed respectively on the opposite end portions of said strip for mutually engaging the opposite end portions to secure said strip in cylindrical operational attitude about the outer surface of said filter element with said fins extending radially outwardly therefrom.

2. The fin structure as defined in claim 1 wherein said means for engaging the outer surface of said air filter element is characterized further to include:
   boss means extending outwardly from the inner side wall of said strip for engaging said air filter element to limit longitudinal displacement of said fin structure in one direction relative thereto; and
   at least one generally U-shaped aperture extending through said strip between the inner and outer side walls thereby defining a corresponding cantilevered lock tab having lip means formed on the free end thereof and extending outwardly from the inner side wall of said strip for engaging the outer surface of said air filter element to limit the longitudinal displacement of said fin structure in the opposite direction relative thereto.

3. The fin structure as defined in claim 1 wherein said fin structure is formed of a unitary mass of polypropylene.

4. The fin structure as defined in claim 1 wherein said lip means is characterized further to include:
- a ledge formed on the free end of the corresponding lock tab and extending outwardly from the inner side wall of said strip; and
- an inclined inner surface extending between the outwardly extending edge of said ledge and said lock tab at a distance from the free end thereof.

5. The fin structure as defined in claim 1 wherein:
- said first coupling means includes a rib formed adjacent one end portion of said strip; and
- said second coupling means includes recess means formed adjacent the opposite end portion of said strip for receiving and retaining said rib therein to mutually engage the opposite end portions of said strip.

6. The fin structure as defined in claim 1 wherein:
- said first coupling means includes an outwardly extending rib formed along one end portion of said strip;
- said second coupling means includes a recess formed along the opposite end portion of said strip; and
- said recess and said rib being so constructed and arranged that said recess securely receives and retains said rib therein to provide mutual engagement between the opposite end portions of said strip.

7. The fin structure as defined in claim 1 wherein:
- said first coupling means includes a rib formed on the outer side wall along one end portion of said strip, said rib having a wedge-shaped cross-section with edges diverging from the outer side wall;
- said second coupling means includes a groove formed in the inner side wall along the opposite end portion of said strip, said groove having a wedge-shaped cross-section with edges diverging from the inner side wall; and
- said rib and said groove being so sized and shaped that said groove securely receives and retains said rib therein to provide mutual engagement between the opposite end portions of said strip.

8. The fin structure as defined in claim 1 wherein:
- said first coupling means includes a first outwardly extending rib formed on one side wall and along one end portion of said strip; and
- said second coupling means includes a second outwardly extending rib formed on the same side wall as said first rib and along the opposite end portion of said strip, and clip means having a generally C-shaped cross-section for mutually engaging said first and second ribs to thereby provide mutual engagement between the opposite end portions of said strip.

9. The fin structure as defined in claim 1 wherein:
- said first coupling means includes at least one hook member extending from one end portion of said strip, each said hook member having a cavity formed therein with said cavity opening in a direction substantially normal to the longitudinal edges of said strip;
- said second coupling means includes at least one corresponding protuberance formed on said strip adjacent the opposite end thereof and extending outwardly from one side wall thereof; and
- the cavity of each said hook member and said corresponding protuberance being so sized and shaped that said protuberance is securely received within said corresponding cavity to mutually engage one another and thereby mutually engage the opposite end portions of said strip.

10. The fin structure as defined in claim 9 wherein said second coupling means is characterized further to include:
- enlargement means formed on the outer end portion of at least one protuberance for retaining said protuberance within said corresponding cavity.

11. The improved fin structure as defined in claim 1 wherein said fin structure is formed of a unitary mass of material.

12. The improved fin structure as defined in claim 11 wherein said material is a plastic material.

13. The fin structure as defined in claim 1 wherein:
- said first coupling means includes a first bight portion formed along one end portion of said strip, said first bight portion being substantially C-shaped in cross-section and extending outwardly from the outer side wall of said strip;
- said second coupling means includes a second bight portion formed along the opposite end portion of said strip, said second bight portion being substantially C-shaped in cross-section and extending outwardly from the inner side wall of said strip; and
- said first and second bight portions being so sized and shaped as to mutually engage one another to thereby mutually engage the opposite end portions of said strip.

14. The fin structure as defined in claim 13 wherein said first coupling means is characterized further to include:
- a resilient lip formed along the one end portion of said strip and extending from the outer side wall a distance beyond said first bight portion, said resilient lip being so sized and shaped as to yieldably engage said second bight portion when said first and second bight portions are mutually engaged to maintain said mutual engagement.

15. The fin structure as defined in claim 13 wherein said second coupling means is characterized further to include:
- a resilient lip formed along the opposite end portion of said strip and extending from the inner side wall a distance beyond said second bight portion, said resilient lip being so sized and shaped as to yieldably engage said first bight portion when said first and second bight portions are mutually engaged to maintain said mutual engagement.

16. The fin structure as defined in claim 1 wherein:
- said first coupling means includes at least one aperture formed in said strip adjacent one end portion thereof;
- said second coupling means includes at least one corresponding protuberance formed on said strip adjacent the opposite end portion thereof and extending outwardly from one side wall thereof; and
- each said aperture and said corresponding protuberance being so sized and shaped that said protuberance is received through said aperture to provide mutual engagement therebetween and thereby mutually engage the opposite end portions of said strip.

17. The fin structure as defined in claim 16 wherein said second coupling means is characterized further to include:
- enlargement means formed on the outer end portion of at least one said protuberance for retaining said protuberance within said corresponding aperture.

18. The fin structure as defined in claim 17 wherein said enlargement is characterized further as being so constructed and arranged as to yieldably retain said protuberance within said corresponding aperture.

19. The fin structure as defined in claim 16 wherein:
   said first coupling means includes at least a pair of said apertures; and
   said second coupling means includes at least a pair of said protuberances, extending outwardly from one side wall of said strip and diverging from one another.

20. The fin structures as defined in claim 16 wherein each of said protuberances extends outwardly from the outer side wall of said strip.

21. In an air filter of the type which includes a housing having a substantially cylindrical filter cavity therein, a substantially cylindrically shaped filter element having a cylindrically shaped end cap formed on one end thereof sized and shaped to be positioned concentrically within the filter cavity with an annular space therebetween, an improved centrifugal air pre-cleaner fin structure for installation about the end cap of the filter element and positioning within the annular space between the filter element and the cylindrical inner wall of the filter cavity, comprising:
   a resilient flat strip having first and second parallel longitudinal edges interconnecting the opposite end portions thereof and having an inner side wall and an outer side wall;
   a plurality of outwardly projecting fins integrally formed on the outer side wall of said strip in longitudinally spaced relation along the first longitudinal edge thereof with each fin disposed diagonally relative to said parallel longitudinal edges;
   outwardly projecting boss means integrally formed on the inner side wall of said strip along the second edge thereof for engaging said filter element to prevent movement of said fin structure relative to said filter element along the longitudinal axis of said filter element in one direction;
   a plurality of outwardly projecting resilient lock tab means integrally formed on the inner side wall of said strip in longitudinally spaced relation along a line parallel to and intermediate the first and second longitudinal edges of said strip for yieldably engaging the end cap of the filter element to prevent movement of said fin structure along the longitudinal axis of said filter element in the opposite direction; and
   first and second coupling means formed respectively on the opposite end portions of said strip for mutually engaging the opposite end portions to secure said strip in a substantially cylindrical configuration about said filter element with said fins extending radially outwardly from the outer side wall into the annular space between the filter element and the cylindrical inner wall of the filter cavity.

* * * * *